(12) United States Patent
Dollar et al.

(10) Patent No.: US 8,499,239 B2
(45) Date of Patent: Jul. 30, 2013

(54) GLOBE CONTAINER

(75) Inventors: Jocelyn Dollar, Redmond, WA (US);
Salman Talat, New York, NY (US);
Petri Juhani Tanninen, Toronto (CA);
James Horgan, Toronto (CA); Kevin Kennedy, Kirkland, WA (US); Dane Storrusten, North Hollywood, CA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/550,039

(22) Filed: Aug. 28, 2009

(65) Prior Publication Data

US 2011/0055696 A1    Mar. 3, 2011

(51) Int. Cl.
*G06F 3/00* (2006.01)
(52) U.S. Cl.
USPC ............................ 715/700; 715/781; 715/808
(58) Field of Classification Search
USPC .................................. 715/702, 781, 808, 700
See application file for complete search history.

(56) References Cited

U.S. PATENT DOCUMENTS

| | | | | |
|---|---|---|---|---|
| 5,515,486 A * | 5/1996 | Amro et al. | | 715/848 |
| 5,602,564 A * | 2/1997 | Iwamura et al. | | 715/782 |
| 5,729,673 A * | 3/1998 | Cooper et al. | | 345/427 |
| 5,805,137 A * | 9/1998 | Yasutake | | 345/156 |
| 6,016,145 A * | 1/2000 | Horvitz et al. | | 715/788 |
| 6,068,486 A * | 5/2000 | Frank et al. | | 434/135 |
| 6,262,736 B1 * | 7/2001 | Nelson | | 715/854 |
| 6,307,574 B1 * | 10/2001 | Ashe et al. | | 715/765 |
| 6,344,681 B1 * | 2/2002 | Matumoto | | 257/666 |
| 6,527,555 B1 * | 3/2003 | Storm | | 434/131 |
| 6,636,246 B1 * | 10/2003 | Gallo et al. | | 715/805 |
| 7,412,650 B2 * | 8/2008 | Gallo | | 715/700 |
| 7,665,026 B2 * | 2/2010 | Janesky | | 715/765 |
| 7,755,605 B2 * | 7/2010 | Daniel et al. | | 345/156 |
| 7,861,186 B2 * | 12/2010 | Stefik et al. | | 715/850 |
| 2004/0212617 A1 * | 10/2004 | Fitzmaurice et al. | | 345/440 |
| 2006/0123359 A1 * | 6/2006 | Schatzberger | | 715/810 |
| 2008/0040689 A1 | 2/2008 | Balakrishnan et al. | | |
| 2008/0180405 A1 | 7/2008 | Han et al. | | |
| 2008/0234032 A1 | 9/2008 | Brunet de Courssou et al. | | |
| 2008/0252616 A1 | 10/2008 | Chen | | |
| 2009/0102805 A1 | 4/2009 | Meijer et al. | | |
| 2009/0199130 A1 * | 8/2009 | Tsern et al. | | 715/810 |
| 2010/0162180 A1 * | 6/2010 | Dunnam et al. | | 715/863 |

OTHER PUBLICATIONS

"Microsoft Surface", Retrieved at <<http://en.wikipedia.org/wiki/Microsoft_Surface>>, Microsoft Surface—Wikipedia, the free encyclopedia, Apr. 17, 2008, pp. 6.

(Continued)

*Primary Examiner* — Phenuel Salomon
(74) *Attorney, Agent, or Firm* — Alleman Hall McCoy Russell & Tuttle LLP

(57) ABSTRACT

A globe container includes a front-side spherical cap. A plurality of content items are arranged with a convex three-dimensional perspective on the front-side spherical cap. The globe container has a changeable virtual orientation that determines which of the plurality of content items are arranged with the convex three-dimensional perspective on the front-side spherical cap. The globe container allows selection of any of the content items displayed on the front-side spherical cap.

13 Claims, 4 Drawing Sheets

OTHER PUBLICATIONS

Ricker, Thomas, "Microsoft multi-touch Sphere surfaces in Redmond", Retrieved at <<http://www.engadget.com/2008/07/29/microsoft-sphere-surfaces-in-redmond/>>, Jul. 29, 2008, pp. 7.

Benko, et al., "Sphere: Multi-Touch Interactions on a Spherical Display", Retrieved at <<http://www.dgp.toronto.edu/~ravin/papers/uist2008_sphere.pdf>>, User Interface Software and Technology (UIST '08), Oct. 19-22, 2008, Monterey, California, USA, pp. 10.

* cited by examiner

GLOBE CONTAINER

BACKGROUND

Graphical user interfaces provide human users with an intuitive mechanism for controlling a computing system. Many different graphical user interfaces have been designed in an attempt to increase user-friendliness while at the same time providing rich functionality. Efforts have also been made to design graphical user interfaces with inviting aesthetics that promote user exploration and feature discovery.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A globe container is disclosed. The globe container includes a front-side spherical cap. A plurality of content items are arranged with a convex three-dimensional perspective on the front-side spherical cap. The globe container has a changeable virtual orientation that determines which of the plurality of content items are arranged with the convex three-dimensional perspective on the front-side spherical cap. The globe container allows selection of any of the content items displayed on the front-side spherical cap.

DETAILED DESCRIPTION

A globe container configured to organize and display content items is disclosed. As described in detail below, the globe container is a simulated three-dimensional globe upon which the various content items can be arranged. The globe container allows content items to be browsed using intuitive navigation gestures, which spin and/or rotate the globe about one or more axes. Items can be arranged on the globe container to convey relative importance. Furthermore, a globe container may be used to browse and/or select a virtually infinite number of different content items in an intuitive manner.

Figure 1:
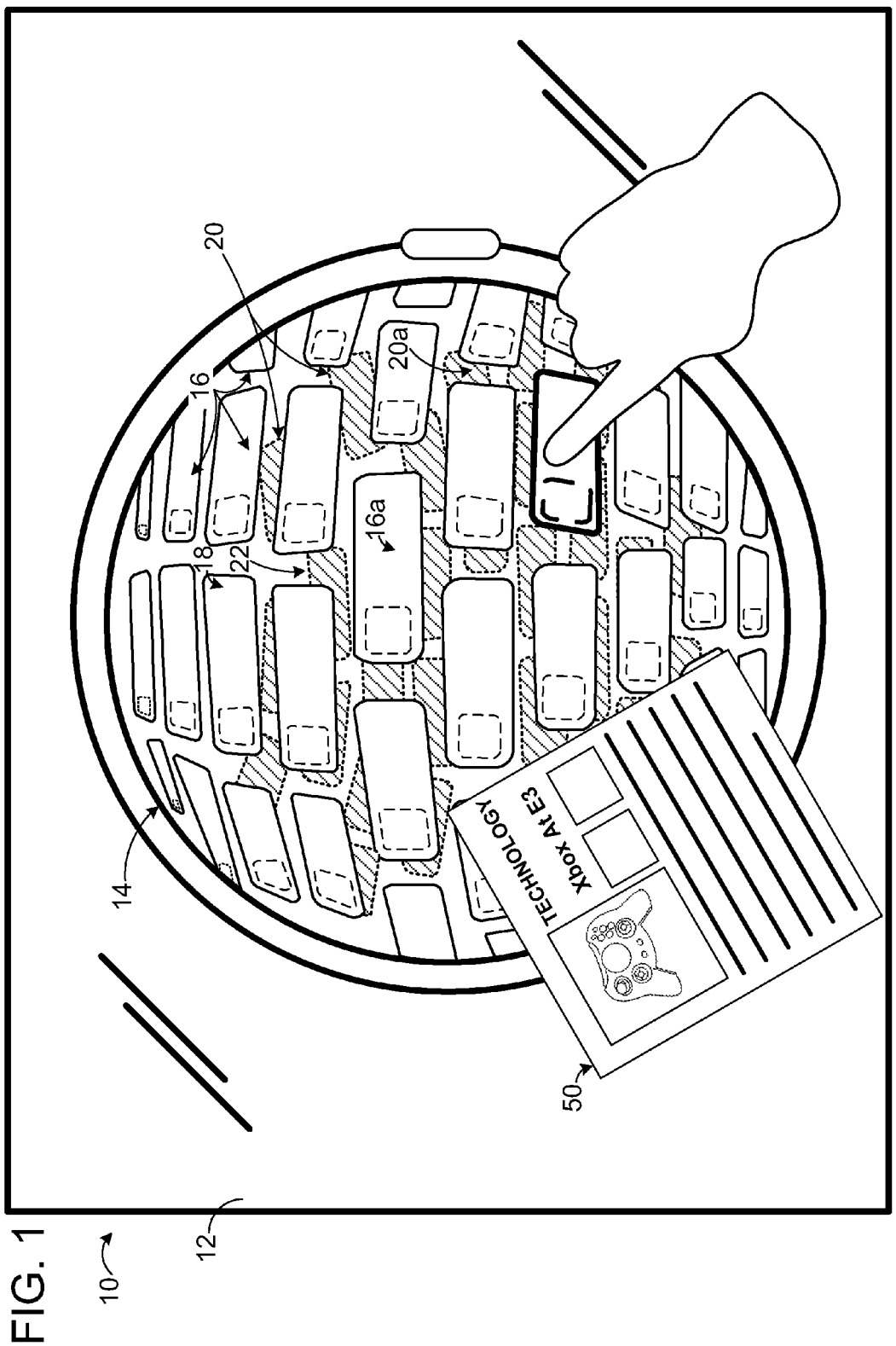
FIG. 1 shows a globe container in accordance with an example embodiment of the present disclosure.

FIG. 1 shows an example computing system 10 including a touch display 12 displaying a globe container 14. The globe container includes a plurality of content items 16 (e.g., content item 16a) arranged with a convex three-dimensional perspective on a front-side spherical cap 18 of the globe container. In other words, the plurality of content items are displayed so as to appear as if the content items are arranged on a surface of a three-dimensional sphere that projects in front of touch display 12.

Furthermore, a plurality of content-item blanks 20 (e.g., content-item blank 20a) are arranged with a concave three-dimensional perspective on a back-side spherical cap 22. In other words, the plurality of content-item blanks are displayed so as to appear as if the content-item blanks are arranged on a surface of a three-dimensional sphere that projects behind touch display 12. To a user viewing the globe container, the content-item blanks appear to be content items that are facing away from the user on the hemisphere of the globe that is simulated to extend behind the screen.

Figure 2:
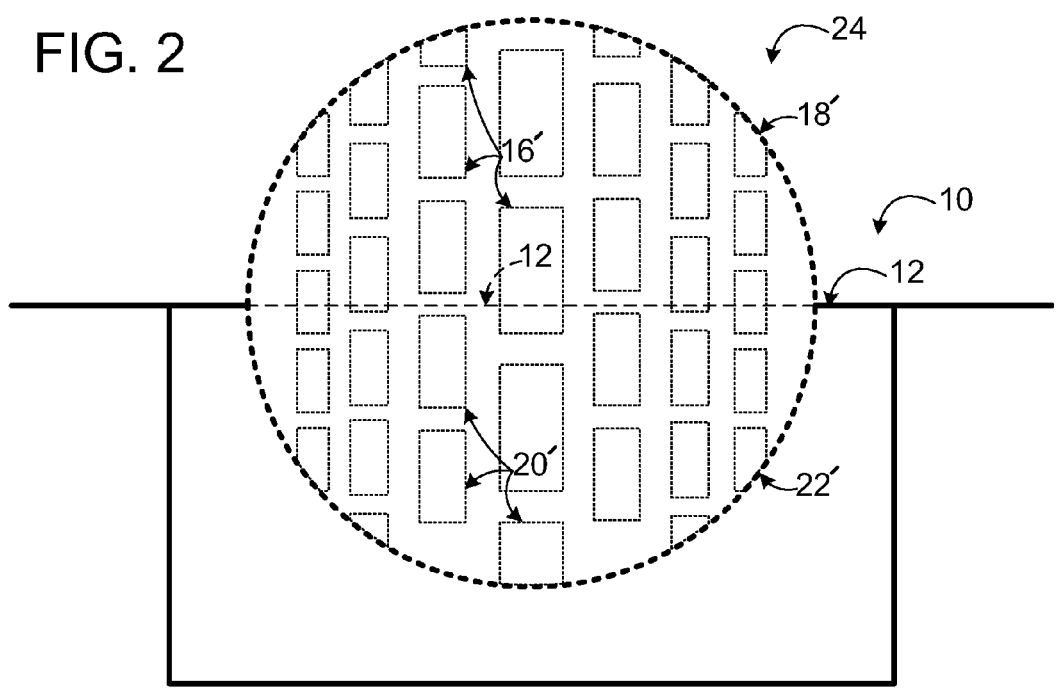
FIG. 2 schematically shows the three-dimensional shape that the globe container simulates with a two-dimensional image.

FIG. 2 schematically shows the visual impression which the globe container is configured to simulate. In particular, FIG. 2 schematically shows a three-dimensional representation 24 of the globe container relative to computing system 10 and touch display 12. As illustrated, the three-dimensional representation 24 includes a front-side spherical cap 18' and a back-side spherical cap 22'. FIG. 2 also schematically shows content items 16' arranged on front-side spherical cap 18' and content-item blanks 20' arranged on back-side spherical cap 22'.

The corresponding front-side spherical cap 18 and back-side spherical cap 22 of FIG. 1, as well as the content items 16 and content-item blanks 20, are two-dimensional projections of front-side spherical cap 18' and back-side spherical cap 22' onto a flat surface. Therefore, although the content items are displayed on a two-dimensional surface, the content items appear as if they are arranged on a three-dimensional spherical shape. Furthermore, the back-side spherical cap, and corresponding content-item blanks, is visible behind the front-side spherical cap.

The herein described content items may take a variety of different forms without departing from the spirit of this disclosure. As an example, the content items can include text, graphics, still or moving images, and/or interactive user interface elements (e.g., check boxes, slider controls, virtual dials, etc.). Such content items may serve as a preview to more detailed content and/or as a mechanism for controlling aspects of the computing system.

As shown in FIG. 1, the content items optionally may be aligned on or near different lines of latitude on the front-side spherical cap. Similarly, the content-item blanks optionally may be aligned on or near different lines of latitude on the back-side spherical cap. Further, as shown in FIG. 1, a size of each content item optionally may be based on a line of latitude of that content item. In other words, content items closer to the poles of the globe container may be relatively small when compared to content items closer to an equator of the globe container.

Figure 3:
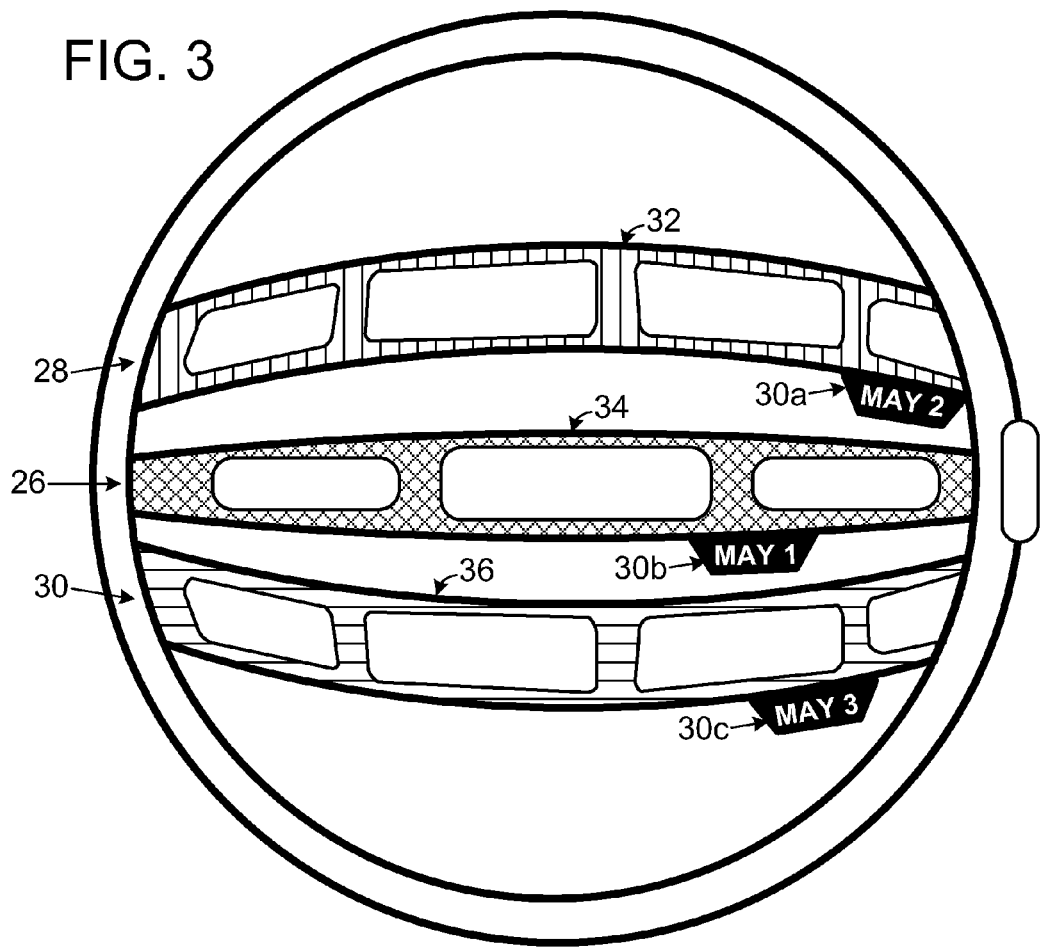
FIG. 3 shows a globe container including color coded bands and band-level descriptors in accordance with another example embodiment of the present disclosure.

As shown in FIG. 3, the content items arranged along one or more lines of latitude optionally may be organizationally grouped together. As one example, the content items may be previews to news stories, and stories from the same date may be grouped together along one or more common lines of latitude. In the illustrated example, content items associated with news stories from May $1^{st}$ are grouped together along an equator 26 of a globe container 14, while content items associated with news stories from May $2^{nd}$ are grouped together along a "northern" line of latitude 28, and content items associated with news stories from May $3^{rd}$ are grouped together along a "southern" line of latitude 30. As demonstrated by this example, items optionally may be arranged on the globe container to convey relative importance. In this case, the most recent news stories are arranged closer to the equator.

A globe container optionally may include a band-level descriptor (e.g., band level descriptor 30*a*, band level descriptor 30*b*, and band level descriptor 30*c*) associated with content items arranged along a line of latitude. The band-level descriptor may be used to identify a common attribute of content items arranged along that line of latitude (e.g., date). If content items from two or more different neighboring lines of latitude are organizationally grouped together, the band-level descriptor may apply to all such content items in the group. When included, a band-level descriptor optionally may move relative to the content items so that it remains visible on a front-side spherical cap, even when the content items are moved off of the front-side spherical cap, as described below.

A globe container optionally may color code content items arranged along a line of latitude. As an example, content items arranged along a common line of latitude may be shaded the same color, include a similarly colored background or border, or otherwise may be visually distinguishable from other content items based on color. As another example, an opaque or at least partially transparent background of the front-side spherical shell may be colored in different bands that correspond to the area surrounding content items on different lines of latitude. In the illustrated example, an upper band 32 is colored a first color (schematically represented with vertical-line shading), an equatorial band 34 is colored a second color (schematically represented with hatched shading), and a lower band 36 is colored a third color (schematically represented with horizontal-line shading).

The globe container simulates a three dimensional sphere and may be configured to move along one or more axes so that different portions of the globe container are displayed as part of the front-side spherical shell. In other words, the globe container has a virtual orientation that determines which of a plurality of content items are arranged with a convex three-dimensional perspective on the front-side spherical cap.

Figure 4:
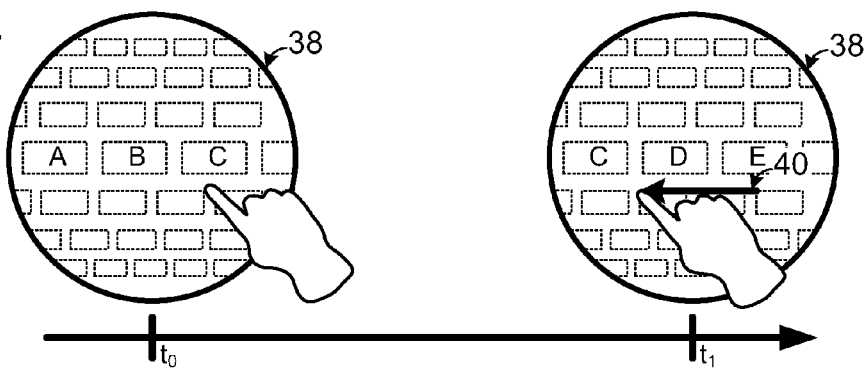
FIGS. 4-6 schematically show navigation gestures changing a virtual orientation of a simplified globe container in accordance with the present disclosure.
Figure 5:
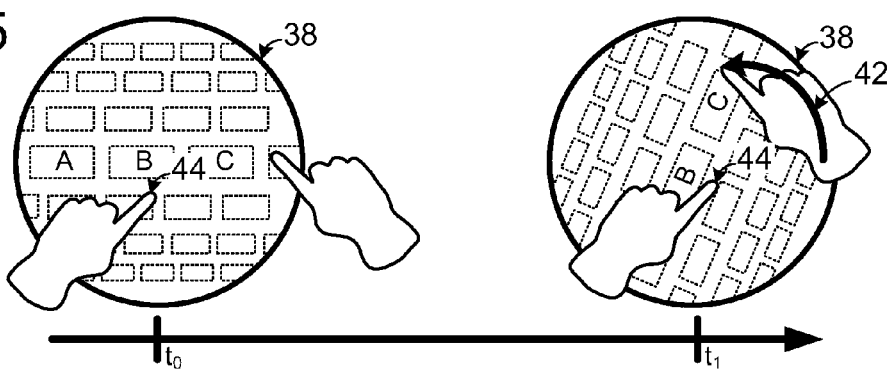
Figure 6:
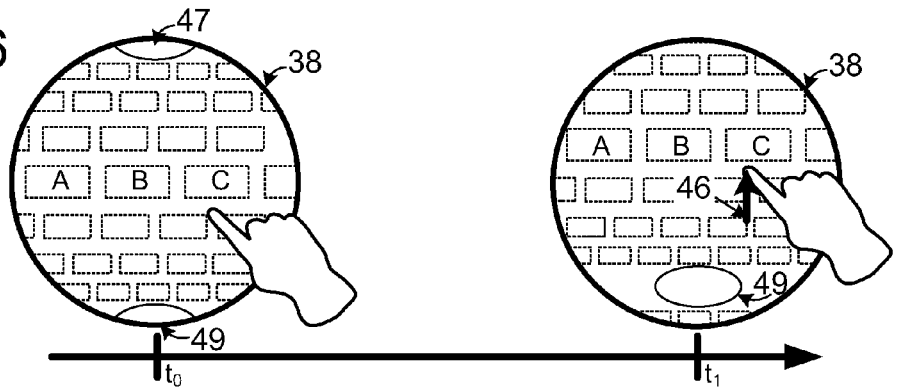

The globe container responds to navigation gestures that change a virtual orientation of the globe container. FIGS. 4-6 somewhat schematically show different navigation gestures applied to a globe container 38, which is simplified to exclude three-dimensional perspective and transparency in the illustrated examples.

As a first example, FIG. 4 shows a navigation gesture that includes a touch-swipe 40 in a straight path along a line of latitude of globe container 38. As can be seen by comparing the orientation of globe container 38 at times $t_0$ and $t_1$, the globe container rotates about an axis extending through the poles of the globe container responsive to such a navigation gesture. As a result, some content items that are displayed at time $t_0$ are not displayed at time $t_1$ (e.g., content item A and content item B), and some content items that are not displayed at time $t_0$ are displayed at time $t_1$ (e.g., content item D and content item E). Other content items (e.g., content item C) are displayed at a different position.

Content items that are moved off of the front-side spherical cap can appear to rotate around to the back-side spherical cap, where content-item blanks can track their relative position. In some embodiments, an actual content item may not be permanently linked to a content-item blank, and when the content-item blank is moved back onto the front-side spherical cap, a different content item may be displayed. In this way, the globe container is configured to display more content items than fit on the front-side spherical cap and the back-side spherical cap. In general, it is to be understood that virtually any logic may be used for determining which content items are moved to the front-side spherical cap as the virtual orientation of the globe container changes, and the globe container may select such content items from a virtually infinite pool of candidate content items.

As a next example, FIG. 5 shows a navigation gesture that includes a touch-swipe 42 in an arcing path around an anchor point 44. As can be seen by comparing the orientation of globe container 38 at times $t_0$ and $t_1$, the globe container rotates about an axis extending through the anchor point and normal to a virtual three-dimensional surface of the front-side spherical cap at the anchor point. In the illustrated example, the anchor point is set by one touch in a multi-touch gesture. As a result, some content items that are displayed upright at time $t_0$ are skewed at time $t_1$. When the globe is displayed on a horizontal display surface, such a navigation gesture may be used to orientate the globe container for viewing from different positions around the display.

As another example, FIG. 6 shows a navigation gesture that includes a touch-swipe 46 in a straight path parallel to an axis extending through the poles of the globe container. As can be seen by comparing the orientation of globe container 38 at times $t_0$ and $t_1$, the globe container rotates about an axis that is perpendicular to an axis that extends through the poles of the globe container. As a result, a "north" pole 47 of the globe container is pushed off of the front-side spherical cap and a "south" pole 49 of the globe container is pulled onto the front side spherical cap.

In some embodiments, an object positioned at a pole of the globe container may be visible when on the front-side spherical cap and hidden when on a back-side spherical cap. As a nonlimiting example, a logo may be positioned on a pole of the globe container, and the logo may be visible when a virtual orientation of the globe container positions the logo on a front-side spherical cap of the globe container. However, even if the front-side spherical cap is partially transparent and content-item blanks are visible through the front-side spherical cap, the logo may be hidden when positioned on the back-side spherical cap.

FIGS. 4-6 provide three different example navigation gestures that may be used to change a virtual orientation of a globe container. It is to be understood that the same types of changes to the virtual orientation may be achieved with different navigation gestures, and/or the same or different navigation gestures may be used to achieve different types of changes to the virtual orientation of the globe container.

As discussed above, a globe container can be used to browse virtually any number of content items in an intuitive manner. Continuing with the example discussed with reference to FIG. 3, the globe container can use the content items to provide previews to different news stories. When a user finds a content item that previews a news story that appears to be of interest, the user may perform a selection gesture directed to the corresponding content item in order to call up a detail window that is related to that content item. The detail window can include virtually any type of information in virtually any format without departing from the spirit of this disclosure. Examples include text, graphics, still and motion videos, widgets, applications, interface controls, and/or other containers, among others.

Figure 7:
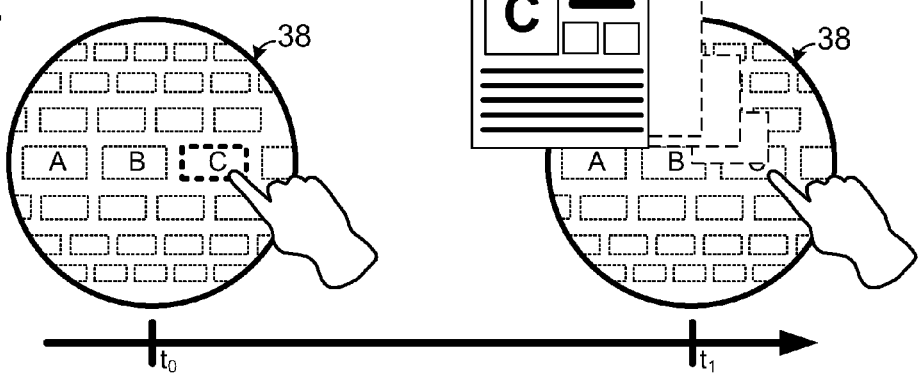
FIG. 7 schematically shows a selection gesture selecting a content item and calling up a detail window in accordance with the present disclosure.

FIG. 7 schematically shows an example scenario in which a selection gesture is directed to content item C at time $t_0$. At time $t_1$, a detail window 48 related to content item C is displayed responsive to the selection gesture. An initial orientation of the detail window optionally may be aligned with the virtual orientation of the globe container when the selected content item is selected, as shown in FIG. 7.

An example detail window 50 is also shown in FIG. 1. As shown in FIG. 1, an orientation of detail window 50 is skewed relative to the content items 16. This may result, for example, if the virtual orientation of the globe container is changed after the detail window is called up. As such, a first user may orientate the globe container to face towards the first user and call up a detail window that is orientated for easy reading by the first reader. A second reader at a different position relative to the globe container may orientate the globe container to face towards the second user and call up a detail window that is orientated for easy reading by the second reader. Once called up, detail windows may be resized, repositioned, and/or reorientated using any suitable gestures.

While described above with reference to a computing system including a touch display, it is to be understood that a globe container may be used with a computing system that uses a variety of different input mechanisms, including mice, track pads, track balls, body-position monitoring, etc.

Figure 8:
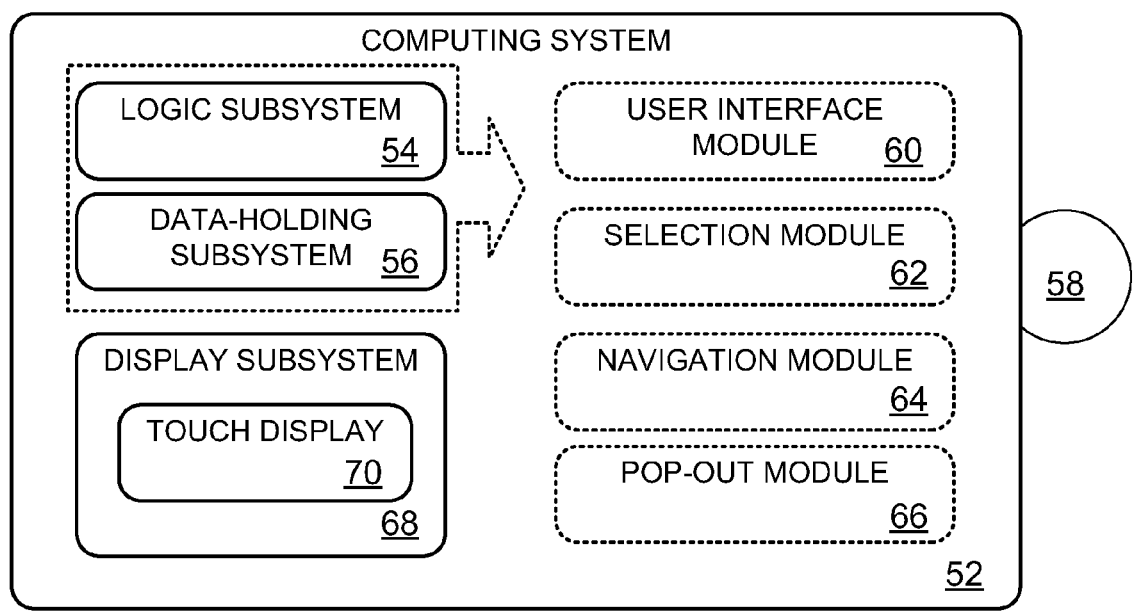
FIG. 8 schematically shows a computing system configured to utilize a globe container in accordance with the present disclosure.

In some embodiments, the above described methods and processes for implementing a globe container may be tied to a computing system. As an example, FIG. 8 schematically shows a computing system 52 that may perform one or more of the above described methods and processes. Computing system 52 includes a logic subsystem 54 and a data-holding subsystem 56. Computing system 52 may optionally include a display subsystem and/or other components not shown in FIG. 8.

Logic subsystem 54 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 56 may include one or more physical devices configured to hold data and/or instructions executable by the logic subsystem to implement the herein described methods and processes. When such methods and processes are implemented, the state of data-holding subsystem 56 may be transformed (e.g., to hold different data). Data-holding subsystem 56 may include removable media and/or built-in devices. Data-holding subsystem 56 may include optical memory devices, semiconductor memory devices, and/or magnetic memory devices, among others. Data-holding subsystem 56 may include devices with one or more of the following characteristics: volatile, nonvolatile, dynamic, static, read/write, read-only, random access, sequential access, location addressable, file addressable, and content addressable. In some embodiments, logic subsystem 54 and data-holding subsystem 56 may be integrated into one or more common devices, such as an application specific integrated circuit or a system on a chip.

FIG. 8 also shows an aspect of the data-holding subsystem in the form of computer-readable removable media 58, which may be used to store and/or transfer data and/or instructions executable to implement the herein described methods and processes.

The term "module" may be used to describe an aspect of computing system 52 that is implemented to perform one or more particular functions. In some cases, such a module may be instantiated via logic subsystem 54 executing instructions held by data-holding subsystem 56. It is to be understood that different modules may be instantiated from the same application, code block, object, routine, and/or function. Likewise, the same module and/or engine may be instantiated by different applications, code blocks, objects, routines, and/or functions in some cases.

Computing system 52 includes a user interface module 60, a navigation module 62, a selection module 64, and a pop-out module 66. The user interface module 60 is configured to display a globe container via a display (e.g., a touch display). The navigation module 62 is configured to change the virtual orientation of the globe container responsive to a navigation gesture directed to a portion of the display displaying the globe container. The selection module 64 is configured to recognize selection of a content item responsive to a selection gesture directed to that content item and/or to a portion of a display displaying that content item. The pop-out module 66 is configured to display a detail window related to a selected content item. These functions are described in more detail above with reference to FIGS. 1-7.

When included, display subsystem 68 may be used to present a visual representation of data held by data-holding subsystem 56. As the herein described methods and processes change the data held by the data-holding subsystem, and thus transform the state of the data-holding subsystem, the state of display subsystem 68 may likewise be transformed to visually represent changes in the underlying data. Display subsystem 68 may include one or more display devices utilizing virtually any type of technology. In some embodiments, display subsystem 68 may include a touch display 70 that is configured to present visual information and to recognize touch input directed to the touch display. Display devices in accordance with this disclosure may be combined with logic subsystem 54 and/or data-holding subsystem 56 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system, comprising:
a touch display;
a user interface module to display a globe container via the touch display, the globe container including a front-side spherical cap, a band level descriptor, and a back-side spherical cap, the front-side spherical cap including a plurality of content items visible with a convex three-dimensional perspective along a plurality of lines of latitude, where a size of each content item is based on a line of latitude of that content item, the band level descriptor associated with content items arranged along a line of latitude and identifying a common attribute of content items arranged along that line of latitude, and the back-side spherical cap including a plurality of content-item blanks visible with a concave three-dimensional perspective behind the front-side spherical cap while both the front-side spherical cap and the back-side spherical cap are displayed, each of the content-item blanks appearing to be a content item facing away from the front-side spherical cap, the globe container having a virtual orientation, the virtual orientation of the globe container determining which of the plurality of content items are arranged with the convex three-dimensional perspective on the front-side spherical cap;

a navigation module to change the virtual orientation of the globe container responsive to a navigation gesture directed to a portion of the touch display displaying the globe container; and a selection module to recognize selection of a content item responsive to a selection gesture directed to a portion of the touch display displaying that content item.

2. The computing system of claim 1, further comprising a pop-out module to display a detail window via the touch display, the detail window related to a selected content item.

3. The computing system of claim 2, where an initial orientation of the detail window is aligned with the virtual orientation of the globe container when the selected content item is selected.

4. The computing system of claim 1, where the globe container color codes content items arranged along a line of latitude.

5. The computing system of claim 1, where an object is positioned at a pole of the globe container, the object visible when on the front-side spherical cap and hidden when on the back-side spherical cap.

6. The computing system of claim 1, where the globe container is configured to display more content items than fit on the front-side spherical cap and the back-side spherical cap.

7. A computing system, comprising:

a touch display;

a user interface module to display a globe container via the touch display, the globe container including a front-side spherical cap, a band level descriptor, and a back-side spherical cap visible behind the front-side spherical cap, the globe container having a virtual orientation that determines which of a plurality of content items are arranged with a convex three-dimensional perspective along a plurality of lines of latitude on the front-side spherical cap, where a size of each content item is based on a line of latitude of that content item, the band level descriptor being associated with content items arranged along a line of latitude and identifying a common attribute of content items arranged along that line of latitude, and where a plurality of content-item blanks are arranged with a concave three-dimensional perspective along the plurality of lines of latitude on the back-side spherical cap;

a navigation module to change the virtual orientation of the globe container responsive to a navigation gesture directed to a portion of the touch display displaying the globe container; a selection module to recognize selection of a content item responsive to a selection gesture directed to a portion of the touch display displaying that content item; and a pop-out module to display a detail window related to a selected content item via the touch display.

8. The computing system of claim 7, where an initial orientation of the detail window is aligned with the virtual orientation of the globe container when the selected content item is selected.

9. The computing system of claim 7, where the globe container color codes content items arranged along a line of latitude.

10. The computing system of claim 7, where an object is positioned at a pole of the globe container, the object visible when on the front-side spherical cap and hidden when on the back-side spherical cap.

11. A data-holding subsystem holding instructions executable by a logic subsystem to implement a method of providing a user interface, the method comprising:

displaying a globe container including a front-side spherical cap including a plurality of content items arranged with a convex three-dimensional perspective along a plurality of color-coded lines of latitude, where a size of each content item is based on a line of latitude of that content item and a band level descriptor identifies a common attribute of content items arranged along a line of latitude, the globe container having a virtual orientation determining which of the plurality of content items are arranged with a convex three-dimensional perspective on the front-side spherical cap;

changing the virtual orientation of the globe container responsive to a navigation gesture directed to the globe container;

recognizing selection of a content item responsive to a selection gesture directed to that content item; and displaying a detail window related to a selected content item.

12. The data-holding subsystem of claim 11, where the globe container further includes a back-side spherical cap visible behind the front-side spherical cap, where a plurality of content-item blanks are arranged with a concave three-dimensional perspective on the back-side spherical cap.

13. The data-holding subsystem of claim 11, where an initial orientation of the detail window is aligned with the virtual orientation of the globe container when the selected content item is selected.

* * * * *